US008537835B2

(12) United States Patent
Saniee

(10) Patent No.: US 8,537,835 B2
(45) Date of Patent: Sep. 17, 2013

(54) METHODS AND APPARATUS FOR SELF-ORGANIZED CACHING IN A CONTENT DELIVERY NETWORK

(75) Inventor: Iraj Saniee, New Providence, NJ (US)

(73) Assignee: Alcatel Lucent, Paris (FR)

( * ) Notice: Subject to any disclaimer, the term of this patent is extended or adjusted under 35 U.S.C. 154(b) by 274 days.

(21) Appl. No.: 12/143,353

(22) Filed: Jun. 20, 2008

(65) Prior Publication Data

US 2009/0316715 A1 Dec. 24, 2009

(51) Int. Cl.
*H04L 12/28* (2006.01)
*H04L 12/56* (2011.01)
*G06F 15/167* (2006.01)

(52) U.S. Cl.
USPC ...... 370/395.72; 370/408; 370/429; 709/212; 709/216; 709/219

(58) Field of Classification Search
USPC ............ 370/395.72, 408, 429, 477; 709/203, 709/212, 216, 219
See application file for complete search history.

(56) References Cited

U.S. PATENT DOCUMENTS

| 6,651,141 | B2 * | 11/2003 | Adrangi | 711/118 |
|---|---|---|---|---|
| 7,076,544 | B2 * | 7/2006 | Katz et al. | 709/223 |
| 7,194,506 | B1 * | 3/2007 | White et al. | 709/203 |
| 7,543,018 | B2 * | 6/2009 | Appelman | 709/203 |
| 7,697,557 | B2 * | 4/2010 | Segel | 370/429 |
| 7,860,948 | B2 * | 12/2010 | Hundscheidt et al. | 709/219 |
| 2002/0087797 | A1 * | 7/2002 | Adrangi | 711/133 |
| 2003/0066090 | A1 * | 4/2003 | Traw et al. | 725/114 |
| 2005/0216554 | A1 * | 9/2005 | Meiman et al. | 709/203 |
| 2005/0240723 | A1 * | 10/2005 | Duzett | 711/113 |
| 2006/0120345 | A1 | 6/2006 | Sung et al. | |
| 2009/0168795 | A1 * | 7/2009 | Segel | 370/429 |

FOREIGN PATENT DOCUMENTS

WO WO 03/088065 A 10/2003

OTHER PUBLICATIONS

"Self-organizing wide area network caches"; Bhattacharjee et al.; IEEE INFOCOM '98. Seventh Annual Joint Conference of the IEEE Computer and Communications Societies. vol. 2, pp. 600-608; Mar. 29-Apr. 2, 1998; current version, Aug. 6, 2002; ISSN: 0743-166X.*
Oguchi et al., "A Proposal for a World-Wide Web Caching Proxy Mechanism", Global Information Infrastructure (GII) Evolution: Interworking Issues. Interworking '96. Third International Symposium on Interworking, p. 533, paras 2, 4, Oct. 1-3, 1996.
Cao et al., "Cost-Aware WWW Proxy Caching Algorithms", Proceedings of the USENIX Symposium on Internet Technologies and Systems, p. 2, col. 2, paragraph 4-p. 3, col. 1, paragraph 8; Dec. 30, 1997.
"Light Reading—Video—Video Over IP—Telecom Report", Downloaded on Jun. 17, 2008, http://www.lightreading.com/document asp?site=lightreading&doc_id=40811&page_num.

* cited by examiner

*Primary Examiner* — Benjamin H Elliott, IV
(74) *Attorney, Agent, or Firm* — Ryan, Mason & Lewis, LLP

(57) ABSTRACT

Methods and apparatus are provided for self-organized caching in a content delivery network. One or more requested content items are cached at a node in a content delivery network. The disclosed method determines if the content item is stored in a local cache; and, if the content item is not stored in a local cache, the following steps are performed: requesting the content item from another node; and storing the content item in the local cache it one or more predefined capacity criteria are satisfied. The content delivery network can be a hierarchical network or a non-hierarchical network. The predefined capacity criteria can evaluate a popularity index of the content item relative to other items stored in the local cache.

21 Claims, 4 Drawing Sheets

FIG. 5

CACHING INDEX
500

| CONTENT ITEM IDENTIFIER (520) | REQUEST COUNT (INDEX) (530) | SIZE MODULE (540) |
|---|---|---|
| A | 100 | C(A) |
| B | 96 | C(B) |
| C | 84 | C(C) |
|  |  |  |
| D | 83 | C(D) |
| E | 80 | C(E) |
| ⋮ | ⋮ | C(A)+C(B)+C(C)≤C & C(A)+C(B)+C(C)+C(D)>C (550) |

CACHE CAPACITY 510

METHODS AND APPARATUS FOR SELF-ORGANIZED CACHING IN A CONTENT DELIVERY NETWORK

FIELD OF THE INVENTION

The present invention relates to content caching techniques and, more particularly, to methods and apparatus for self-organized content caching in a content delivery network

BACKGROUND OF THE INVENTION

Content delivery networks or content distribution networks (CDNs) deliver content (such as large media content) to end users. Nodes in a content delivery network cooperate with each other to satisfy requests for content by end users. Typically, content delivery networks employ one or more optimization techniques to improve the delivery process. For example, content delivery networks often optimize the delivery process to reduce the bandwidth costs, improve end-user performance, or both. When optimizing for end-user performance, for example, a user request is typically sent to a node that can deliver the content quickly to the user (e.g., by selecting a node that has the fewest hops or that is the fewest number of network seconds away from the requestor)

Nodes in a content delivery network often store content that has been requested by one user in a cache for subsequent delivery to one or more additional users. In this manner, other users served by the same node that want the same cached item can obtain the item from the cache. Existing caching schemes used by content distribution companies, such as Akamai Technologies, Inc., of Cambridge, Mass., are generally designed for relatively small content (on the order of mega bytes or less) and for Internet-type networks. Such content delivery networks provide effective caching, where requested content is often stored in clusters relatively close to end users. As a result, most requested files do not have to travel from the original server to reach each destination, saving in bandwidth usage at each hop and also reducing latency As the popularity of next generation network applications increases, such as video on demand (VOD) and Internet television services, the number and size of the files to be stored in a cache will significantly increase. For example, a two hour full feature film in a reasonably high resolution format may be on the order of 5 GB (similar to the storage requirements of a DVD). Thus, caching capacity issues will become increasingly significant, with a caching capacity on the order of 100 s of Terabytes easily contemplated. Similarly, bandwidth savings due to good caching schemes can have a very large impact on bandwidth requirements in large-content delivery networks.

A need therefore exists for caching techniques in large-content delivery networks that effectively use the caches and reduce required bandwidth. Unlike small size content (KB to MB sizes), this type of content is typically owned by the video content owner/provider. Therefore, such content can only be cached in specific nodes within a typically proprietary network which is most likely architected for this kind of content delivery. To avoid the significant overhead of constant computation of best locations for specific items and their popularity distribution, as done today in content delivery networks, a need therefore exists for self-organizing caching techniques in such content delivery networks. In this manner, the data stored in the cache can be organized without significant monitoring or management.

SUMMARY OF THE INVENTION

Generally, methods and apparatus are provided for self-organized caching in a content delivery network. As used herein, "self-organized" shall mean caching schemes that do not rely on an external agent to provide forecasts of content popularity or demand distribution. Further, self-organized mechanisms typically obviate the need for explicit communication between the nodes for the sole purpose of content organization and instead rely on the emergence of demand patterns in the locality of each cache node to determine the course of action.

According to one aspect of the invention, one or more requested content items are cached at a node in a content delivery network. The disclosed method determines if the content item is stored in a local cache; and, if the content item is not stored in a local cache, the following steps are performed: requesting the content item from another node; and storing the content item in the local cache if one or more predefined capacity criteria are satisfied. The content delivery network can be a hierarchical network or a non-hierarchical network.

In an exemplary hierarchical network implementation, the request for the content item is received from either an end-user or a child node. If the content item is not stored in a local cache, the content item is requested from a parent node. In addition, once obtained, the content item is provided to the requesting end-user or child node.

The predefined capacity criteria can evaluate a popularity index of the content item relative to other items stored in the local cache. For example, the predefined capacity criteria can evaluate a memory requirement of the content item relative to a capacity of the local cache and memory requirements of other items stored in the local cache A more complete understanding of the present invention, as well as further features and advantages of the present invention, will be obtained by reference to the following detailed description and drawings.

BRIEF DESCRIPTION OF THE DRAWINGS

FIG. 5 is a sample table from an exemplary caching index that incorporates features of the present invention.

DETAILED DESCRIPTION

The present invention provides a caching procedure with relatively little communication and computation overhead for hierarchical and non-hierarchical networks. Hierarchical networks are often used in customer access networks, such as those implemented by telephone companies (e.g., those employing Public Switched Telephone Networks (PSTNs)). Increasingly, telephone access broadband networks are being used for more than telephone services For example, many telephone companies now provide broadband Internet services and video delivery services over the telephone access network Among other benefits, telephone access networks are generally reliable networks that already have significant interconnected storage capacity for storing the large files associated with television and video on demand services.

Figure 1:
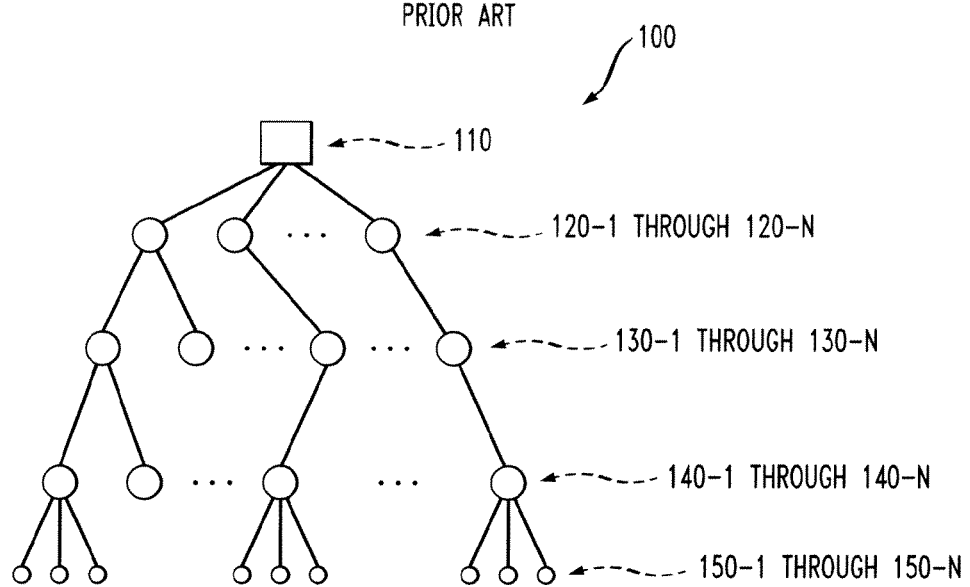
FIG. 1 illustrates an exemplary hierarchical network environment in which the present invention can be implemented.

FIG. 1 illustrates an exemplary hierarchical network environment 100 in which the present invention can be implemented. It is noted the node designations in FIG. 1 are for illustration only and are not required by the proposed scheme. For a mole detailed discussion of suitable hierarchical network environments 100, see, for example, "Engineering and Operations in the Bell System," Bell Telephone Laboratories, 2nd Edition, Hardcover, 1978, incorporated by reference herein.

As shown in FIG. 1, the exemplary hierarchical network environment 100 comprises a head end server 110, one or more routers 120-1 through 120-N (hereinafter, collectively referred to as routers 120), one or more central offices 130-1 through 130-N (hereinafter, collectively referred to as central offices 130), one or more DSLAMs (Digital Subscriber Line Access Multiplexers) 140-1 through 140-N (hereinafter, collectively referred to as DSLAMs 140), all arranged in a hierarchical, tree-like configuration, in a well-known manner. Each end user 150-1 through 150-N (hereinafter, collectively referred to as end users 150) connects to the network 100 by means of a DSLAM 140

The caching procedures of the present invention can be implemented by any node 110, 120, 130, 140 in any level of the exemplary hierarchical network environment 100. An exemplary node 300 in accordance with the present invention is discussed further below in conjunction with FIG. 3.

Generally, requests from end-users 150 arrive at the leaf nodes (i.e., at a DSLAM 140 associated with the end user 150) In addition, all supported content is generally available (at the start and also at any point in time) at the Head End (HE) 110, which is the toot of the tree 100. In addition, content may be cached at one or more intermediate nodes. It is noted that requested content, also referred to herein as content items, can include full length items (such as a full length movie), as well as one or more segments of a fall length item. For an example of a popular content item, consider the movie "The Wizard of Oz" For an example of a segment of this content item (which may be even more popular than the full item) consider the segment containing the popular expression "Toto, I've got a feeling we're not in Kansas anymore"

Figure 2:
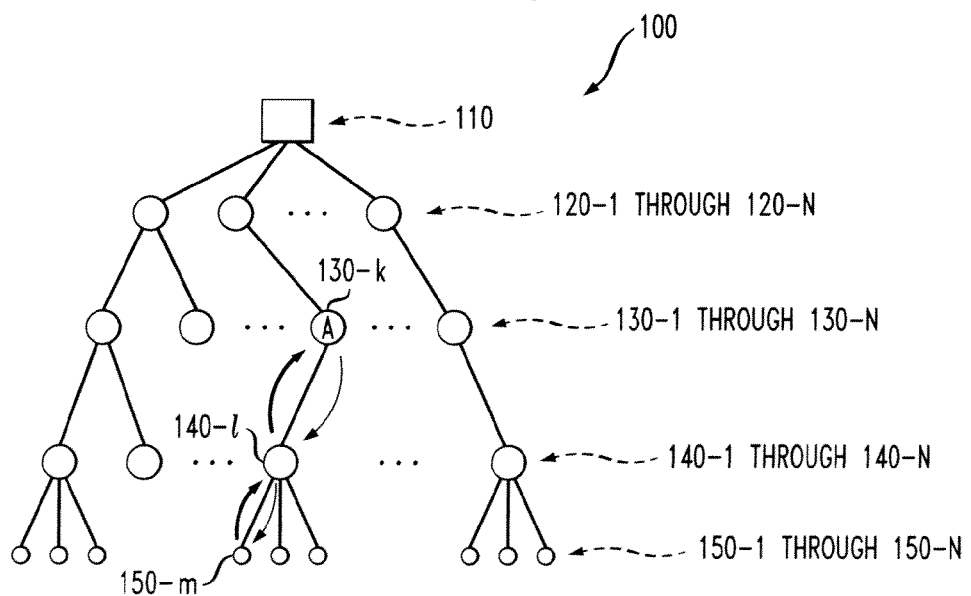
FIG. 2 illustrates an end-user request in the exemplary hierarchical network environment of FIG. 1 in accordance with the present invention.

FIG. 2 illustrates an end-user request in the exemplary hierarchical network environment 100 of FIG. 1 in accordance with the present invention. As shown in FIG. 2, an end-user 150-$m$ requests a content item A. The parent node, DSLAM 140-$l$, determines that content item A is not in its cache. Thus, DSLAM 140-$l$ requests content item A from its own parent, central office 130-$k$. In this example, central office 130-$k$ has a copy of content item A Thus, central office 130-$k$ will provide content item A to DSLAM 140-$l$. DSLAM 140-$l$ will deliver item A to end-user 150-$m$ and also store item A in its cache, fox example, if the index of item A is higher than the index of other items in the cache of DSLAM 140-$l$ (as discussed further below in conjunction with FIG. 4). Over time, item A's index at central office 130-$k$ may be smaller than other items and therefore be eventually deleted from the cache of central office 130-$k$. Item A remains in the cache of those nodes that are closest to the end nodes that request it more often than other end nodes.

Figure 3:
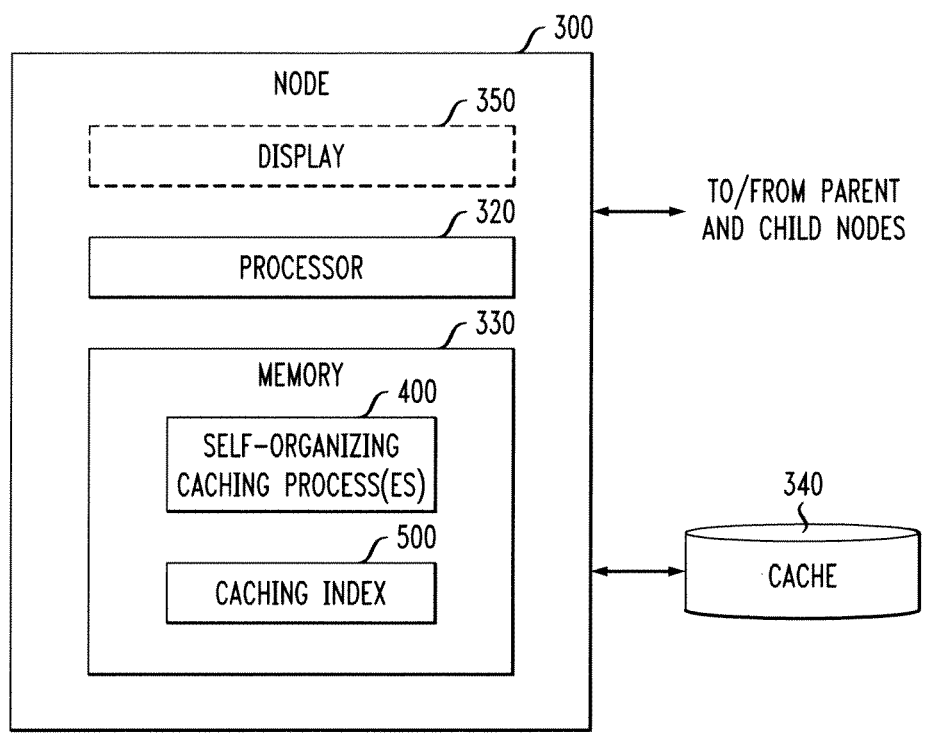
FIG. 3 is a block diagram of an exemplary node in accordance with the present invention.

FIG. 3 is a block diagram of an exemplary node 300 in accordance with the present invention. As shown in FIG. 3, memory 330 configures the processor 320 to implement the self-organizing caching procedures, steps, and functions disclosed herein (collectively, shown as 400 in FIG. 3 and discussed further below in conjunction with FIG. 4). The memory 330 could be distributed or local and the processor 320 could be distributed or singular. The memory 330 could be implemented as an electrical, magnetic or optical memory, or any combination of these or other types of storage devices. It should be noted that each distributed processor that makes up processor 320 generally contains its own addressable memory space. It should also be noted that some or all of computer system 300 can be incorporated into a personal computer, server, laptop computer, handheld computing device, application-specific circuit or general-use integrated circuit. In addition, each exemplary node 300 has an associated cache 340.

Figure 4:
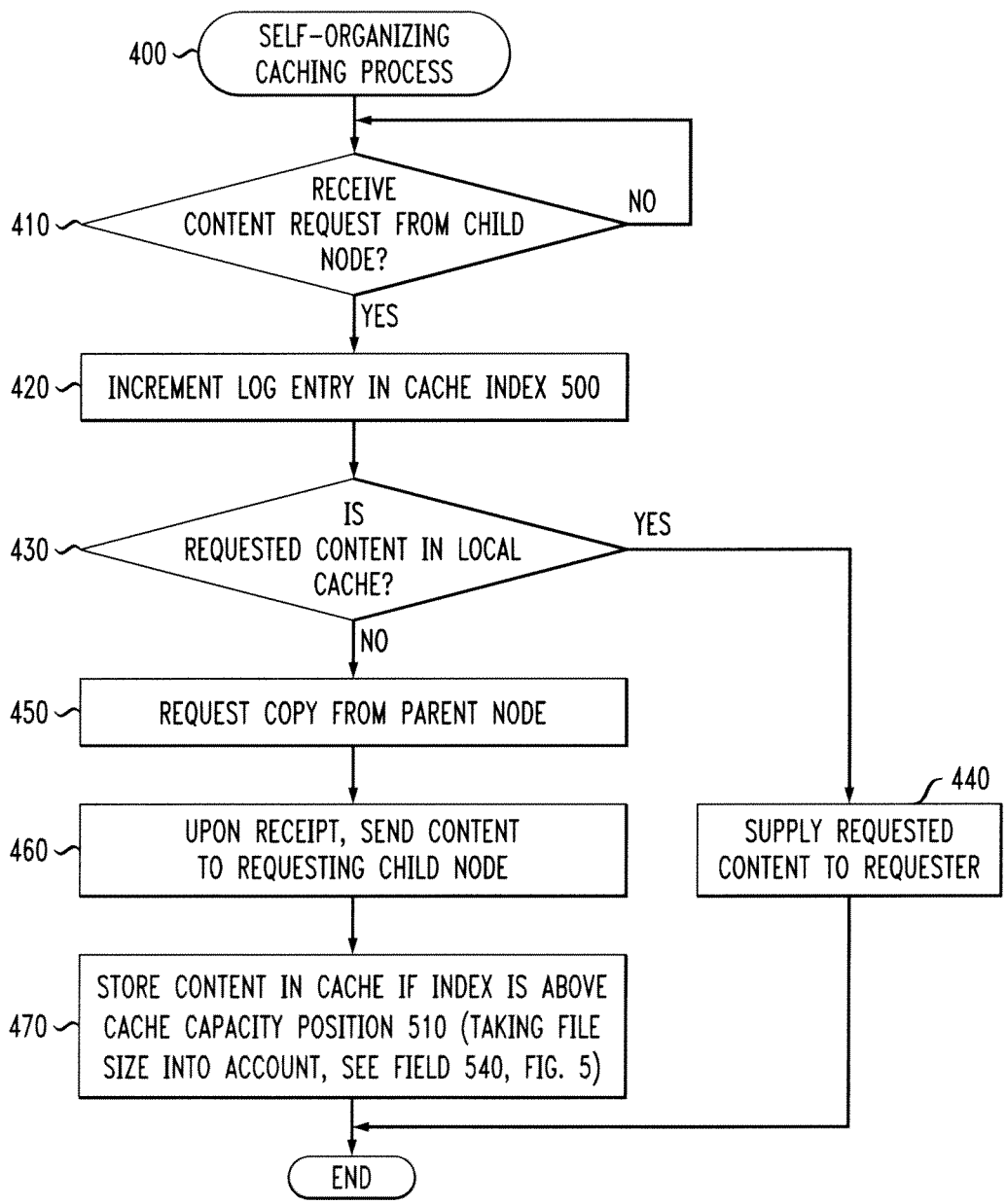
FIG. 4 is a flow chart describing an exemplary implementation of a self-organizing caching process incorporating features of the present invention.

FIG. 4 is a flow chart describing an exemplary implementation of a self-organizing caching process 400 incorporating features of the present invention. As shown in FIG. 4, the self-organizing caching process 400 initially determines if a content request is received from a child node during step 410. It is noted that requests for content items, such as video or movies, arrive at the lowest levels (leaf nodes 150) of the hierarchy 100 according to some distribution (such as a Poisson distribution) with different arrival parameters representing the items' popularity. It has been estimated, for example, that only 10% of all available titles are requested by 95% of customers. Thus, caching of popular content items in accordance with the present invention can be very effective in such demand environments Once a content request is received, the log entry for the content item is incremented during step 420 in the cache index 500, discussed further below in conjunction with FIG. 5. A further test is performed during step 430 to determine if the requested content is already in the local cache 340. If it is determined during step 430 that the requested content is already in the local cache 340, then the requested content is delivered to the requester during step 440

If, however, it is determined during step 430 that the requested content is not in the local cache 340, then a copy of the requested content is requested from the parent node during step 450. Once the requested content is received from the parent node, the requested content is sent to the requesting child node during step 460. Finally, the requested content is stored in the local cache 340 during step 470 if the index of the requested content is above the capacity position 510 and size module 540 (FIG. 5) of the cache 340. Thus, each node, at the time of the arrival of a content requests always caches the requested item if there is room in the local cache 340. If there is insufficient storage space, then the node computes the item's "index" and bumps the item(s) with the lowest index(es) in its cache 340 in order to cache the new item (which must have a higher index than all those items bumped). In one exemplary implementation, the "index" of an item at a node is defined as the number of times the item has been requested from that node so far (e.g., a popularity measure). In further variations, very dynamic content is accommodated by having a "window" and/or redefining the index to allow for more complex (temporal) cost structures.

In this manner, the procedure 400 starts by leaf nodes 140 caching items that are requested and also nodes 130, 120 along the route to the head end 110 also caching various requested items. Over time, however, items that are most popular axe cached at the bottom of the hierarchy (and closet to the leaf nodes 140 among which the item is popular) while less popular items are cached closer to the head end 110. Nodes at a higher level in the hierarchy have different constituencies and see different popularity distributions (resulting in different content items being cached at different levels and at different leaf nodes). This mitigates against the "cost" of getting items from the head end 110 or from parents or grand parents repeatedly while erasing from the higher level caches those popular content items that are now cached close to the leaf nodes 140.

A popular movie, for example might be popular across all DSLAMs 140, so the popular movie will be cached at all DSLAMs 140, but will not be stored in the cache at the-next-level-up in the hierarchy 100, requests to the next level for the popular movie die out as the movie can be delivered from the caches 340 of the DSLAMs 140 In general, higher levels in the hierarchy 100 see requests for popular items that are not popular enough to be cached at the lower level FIG. 5 is a sample table from an exemplary caching index 500 that incorporates features of the present invention An index can be created at each network node, when necessary, which can be used to add or delete content from the cache 340 without additional communication with other nodes. It is noted that one could reinforce the computation of the index by using Nielsen type ratings as a prior distribution to make convergence of the scheme faster, if such data is available and can be distributed freely to the nodes in the hierarchy 100. In the exemplary scheme shown in FIG. 5, each node only keeps track of the number of times an item has been requested from it by its child nodes.

As shown in FIG. 5, the exemplary caching index 500 includes a plurality of records, each associated with a different content item. For each content item, there is a content identifier in field 520, a request count in field 530, indicating the number of times the content item has been requested, and a size module 540. In addition, the exemplary caching index 500 has a cache capacity indicator 510 that identifies the current capacity of the local cache 345. In general, if the index of a given content item is above the cache capacity 510, then the item is stored in the local cache 340. If, however; the index of a given content item is below the cache capacity 510, then the item is not stored in the local cache 340. The size module 540 indicates the memory requirements of each requested content item. In addition, record 550 indicates that the combined memory requirements for content items A, B, and C are below the cache capacity (C) 510, and with the additional content item D, the cache capacity (C) 510 is exceeded.

In the example shown in FIG. 5, item D has been requested 83 times. The next time item D is requested, the count will be incremented to 84 Since the capacity 510 will not permit item D to be stored, it will not be stored until the index of item D exceeds the index of item C. Thus, item D will be stored in the cache once the request count increases to 85 (replacing item C with item D). In general, D will be stored if $C(A)+C(B)+C(D) \leq C$.

It can be shown that the present invention minimizes the following expression, for all values of m:

$$\Sigma m \times h$$

where m is the size of the downloaded item and h is the hop cost for delivering information to a user can be expressed as the number of hops traversed between the source of the information and the end user. Thus, the advantages of the present invention can be said to increase with the size of the downloaded item (when considering the combined caching and transport cost). Thus, the present invention can significantly reduce the bandwidth requirements on each hop in the network 100

Among other benefits of the present invention, there is no additional "state" to be exchanged between nodes, other than requesting items from its parent nodes for items not already in its cache, which has to happen anyway. Thus, the disclosed scheme can be said to require zero "state." Yet, over time, contents move from the head end 110 in downstream caches according to their popularity, thus self-organizing the caches only based on their popularity.

CONCLUSION

While the exemplary network environment 100 shown in FIG. 1 is a hierarchical (tree) network, the network may also be implemented in non-hierarchical networks, as would be apparent to a person of ordinary skill in the art. In a hierarchical network, there is a unique, predictable path between two points. In non-hierarchical networks, however, there may be multiple paths between two points. Thus, a given node in the network may or may not see a given request. In one exemplary implementation for non-hierarchical networks, the routing is organized such that a structure is imposed for routing between two points. For example, if there are two paths between points A and B, the routing structure can ensure that 50% of the requests travel on each path For a discussion of an alternate Video over IP network, see "Video Over IP," http://www.lightreading.com/document.asp?site=lightreading&doc_id=40811&page_number=4, incorporated by reference herein While FIG. 4 shows an exemplary sequence of steps, it is also an embodiment of the present invention that the sequence may be varied. Various permutations of the algorithm are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, microcontroller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor; a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. A method for caching one or more content items at a node in a content delivery network, comprising the steps of:
   receiving a request for a content item;
   determining if said content item is stored in a local cache; and
   if said content item is not stored in a local cache, performing the following steps:
   requesting said content item from an intermediate node, wherein said intermediate node is one of a plurality of intermediate nodes located at one of at least three intermediate hierarchical levels, and wherein a count of said intermediate hierarchical levels is sufficient to self-organize said one or more content items; and
   storing and organizing said content item in said local cache if one or more predefined capacity criteria are satisfied based on statistics that are only locally generated, wherein said statistics comprise one or more of a content popularity forecast and a demand distribution forecast.

2. The method of claim 1, wherein said content delivery network is a hierarchical network.

3. The method of claim 1, wherein said content delivery network is a non-hierarchical network.

4. The method of claim 3, further comprising the step of structuring routing paths in said non-hierarchical network.

5. The method of claim 1, wherein said intermediate node is a parent node in a hierarchical network.

6. The method of claim 1, wherein said predefined capacity criteria evaluates a popularity index of said content item relative to other items stored in said cache of said intermediate node, wherein said popularity index of each content item is generated by counting requests received by said intermediate node for each content item.

7. The method of claim 1, wherein said predefined capacity criteria evaluates a memory requirement of said content item relative to a capacity of said local cache and memory requirements of other items stored in said local cache.

8. The method of claim 1, wherein said request for said content item is received from one or more of an end-user and a child node.

9. The method of claim 1, further comprising the step of providing said content item to one or more of an end-user and a child node.

10. An apparatus for caching one or more content items at a node in a content delivery network, the apparatus comprising:
    a memory; and
    at least one processor, coupled to the memory, operative to:
    receive a request for a content item;
    determine if said content item is stored in a local cache; and
    if said content item is not stored in a local cache, perform the following steps:
    request said content item from an intermediate node, wherein said intermediate node is one of a plurality of intermediate nodes located at one of at least three intermediate hierarchical levels, and wherein a count of said intermediate hierarchical levels is sufficient to self-organize said one or more content items; and
    store and organize said content item in said local cache if a predefined capacity criteria is satisfied based on statistics that are only locally generated, wherein said statistics comprise one or more of a content popularity forecast and a demand distribution forecast.

11. The apparatus of claim 10, wherein said content delivery network is a hierarchical network.

12. The apparatus of claim 10, wherein said content delivery network is a non-hierarchical network.

13. The apparatus of claim 12, wherein said processor is further configured to structure routing paths in said non-hierarchical network.

14. The apparatus of claim 10, wherein said predefined capacity criteria evaluates a memory requirement of said content item relative to a capacity of said local cache and memory requirements of other items stored in said local cache.

15. The apparatus of claim 10, wherein said intermediate node is a parent node in a hierarchical network.

16. The apparatus of claim 10, wherein said predefined capacity criteria evaluates a popularity index of said content item relative to other items stored in said cache of said intermediate node, wherein said popularity index of each content item is generated by counting requests received by said intermediate node for each content item.

17. The apparatus of claim 10, wherein said request for said content item is received from one or more of an end-user and a child node.

18. The apparatus of claim 10, wherein said processor is further configured to provide said content item to one or more of an end-user and a child node.

19. An article of manufacture for caching one or more content items at a node in a content delivery network, comprising a tangible machine readable storage medium containing one or more programs which when executed implement the steps of:
    receiving a request for a content item;
    determining if said content item is stored in a local cache; and
    if said content item is not stored in a local cache, performing the following steps:
    requesting said content item from an intermediate node, wherein said intermediate node is one of a plurality of intermediate nodes located at one of at least three intermediate hierarchical levels, and wherein a count of said intermediate hierarchical levels is sufficient to self-organize said one or more content items; and
    storing and organizing said content item in said local cache if a predefined capacity criteria is satisfied based on statistics that are only locally generated, wherein said statistics comprise one or more of a content popularity forecast and a demand distribution forecast.

20. The article of manufacture of claim 19, wherein said predefined capacity criteria evaluates a memory requirement of said content item relative to a capacity of said local cache and memory requirements of other items stored in said local cache.

21. A method for caching one or more content items at a node in a content delivery network, comprising the steps of:
- receiving a request for a content item;
- determining if said content item is stored in a local cache; and
- if said content item is not stored in a local cache, performing the following steps:
- requesting said content item from an intermediate node, wherein said intermediate node is one of a plurality of intermediate nodes located at one of one or more intermediate hierarchical levels, and wherein a count of said intermediate hierarchical levels is sufficient to self-organize said one or more content items; and
- storing and organizing said content item in said local cache if one or more predefined capacity criteria are satisfied based on statistics that are only locally generated, wherein said statistics comprise one or more of a content popularity forecast and a demand distribution forecast.

* * * * *